United States Patent
Hsu et al.

(10) Patent No.: US 12,044,844 B2
(45) Date of Patent: Jul. 23, 2024

(54) CALIBRATION KIT FOR AN OPTICAL SCANNING DEVICE

(71) Applicant: QISDA CORPORATION, Taoyuan (TW)

(72) Inventors: Tzu-Huan Hsu, Taoyuan (TW); Po-Fu Wu, Taoyuan (TW); Yuan-Yu Hsiao, Taoyuan (TW); Ching-Huey Wang, Taoyuan (TW); Chih-Kang Peng, Taoyuan (TW); Chun-Ming Shen, Taoyuan (TW); Chih-Ming Hu, Taoyuan (TW); Yi-Ling Lo, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 436 days.

(21) Appl. No.: 17/467,429

(22) Filed: Sep. 6, 2021

(65) Prior Publication Data

US 2022/0252873 A1    Aug. 11, 2022

(30) Foreign Application Priority Data

Feb. 9, 2021   (CN) .......................... 202110177382.5

(51) Int. Cl.
*G02B 27/00*   (2006.01)
*G01B 5/00*    (2006.01)
(Continued)

(52) U.S. Cl.
CPC ....... *G02B 27/0031* (2013.01); *G01B 5/0004* (2013.01); *G01B 5/24* (2013.01); *G01B 9/02055* (2013.01); *G02B 26/10* (2013.01)

(58) Field of Classification Search
CPC .... G02B 27/0031; G02B 26/10; G02B 7/004; G02B 7/02; G02B 7/023; G02B 7/003;
(Continued)

(56) References Cited

U.S. PATENT DOCUMENTS

| | | | |
|---|---|---|---|
| 2011/0026144 A1* | 2/2011 | Shyu ...................... | G02B 7/021 |
| | | | 359/819 |
| 2013/0063655 A1* | 3/2013 | Hsu ........................ | H04N 23/55 |
| | | | 156/303.1 |

(Continued)

FOREIGN PATENT DOCUMENTS

CN         111598959 A       8/2020

OTHER PUBLICATIONS

Hu et al "Lens Barrel Assembly, Lens Assembly, Camera Module and Electronic Device", Dec. 8, 2020, CN212111941U (Year: 2020).*

*Primary Examiner* — Sang H Nguyen

(57) ABSTRACT

An calibration kit includes a base, a combination of calibration parts, and a manipulation part. The combination of calibration parts is disposed on the base and includes a first calibration part and a second calibration part. The first calibration part has a first calibration surface. The second calibration part has a second calibration surface. The first calibration part and the second calibration part are relatively movable in a movement direction and are movable relative to the base. The manipulation part is movably or rotatably disposed on the base. The manipulation part is configured to be operable to drive the first calibration part and the second calibration part to move in the movement direction relative to the base, so that the combination of calibration parts forms a three-dimensional calibration surface configuration through the first calibration surface and the second calibration surface.

15 Claims, 15 Drawing Sheets

(51) Int. Cl.
*G01B 5/24* (2006.01)
*G01B 9/02055* (2022.01)
*G02B 26/10* (2006.01)

(58) Field of Classification Search
CPC .... G02B 7/025; G02B 7/021; G02B 13/0045; G01B 9/02055; G01B 5/0004; G01B 5/24; H04N 17/002; H04N 23/57; H04N 23/54; H04N 23/55
See application file for complete search history.

(56) References Cited

U.S. PATENT DOCUMENTS

| | | |
|---|---|---|
| 2013/0114949 A1 | 5/2013 | Koh |
| 2015/0002726 A1* | 1/2015 | Schmieder .............. G02B 7/08 359/823 |
| 2017/0254978 A1* | 9/2017 | Chong ................ G02B 27/646 |
| 2018/0246290 A1* | 8/2018 | Wang ...................... G02B 7/02 |

* cited by examiner

CALIBRATION KIT FOR AN OPTICAL SCANNING DEVICE

BACKGROUND OF THE INVENTION

1. Field of the Invention

The present invention relates to a calibration kit for an optical scanning device, and more particularly to a calibration kit providing a three-dimensional calibration surface configuration for an optical scanning device.

2. Description of the Prior Art

Recently, optical scanning devices have been widely used. The optical scanning device needs to be calibrated whether it is shipped from the factory or after long-term use. Therein, after long-term use of the optical scanning device, the internal projection light sources of the optical scanning device may deteriorate, and the decay of each color light source (e.g. R, G and B color light sources) may be inconsistent, so the light sources need to be calibrated. Furthermore, the focal position of the lens inside the optical scanning device may also be shifted due to long-term use, so the lens needs to be calibrated too. Therefore, providing simple and convenient calibration tools has become one of the research topics in the industry.

SUMMARY OF THE INVENTION

An objective of the invention is to provide a calibration kit for an optical scanning device. The calibration kit the linkage relationship between parts to provide users with convenient operation.

A calibration kit for an optical scanning device according to the present invention includes a base, a combination of calibration parts, and a manipulation part. The combination of calibration parts is disposed on the base and includes a first calibration part and a second calibration part. The first calibration part has a first calibration surface. The second calibration part has a second calibration surface. The first calibration part and the second calibration part are movable relative to each other in a movement direction and are movable relative to the base. The manipulation part is movably or rotatably disposed on the base. The manipulation part is configured to be operable to drive the first calibration part and the second calibration part to move relative to the base, so that the combination of calibration parts forms a three-dimensional calibration surface configuration through the first calibration surface and the second calibration surface. Thereby, the user can easily operate the manipulation part to make the calibration kit form the three-dimensional calibration surface configuration, and then can calibrate an optical scanning device through the three-dimensional calibration surface configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
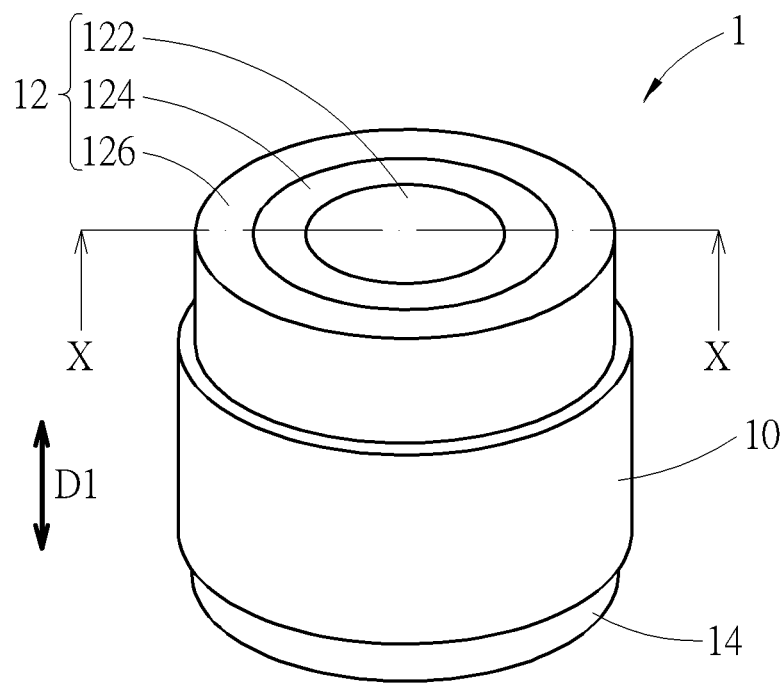
FIG. 1 is a schematic diagram illustrating a calibration kit for an optical scanning device according to an embodiment.
Figure 2:
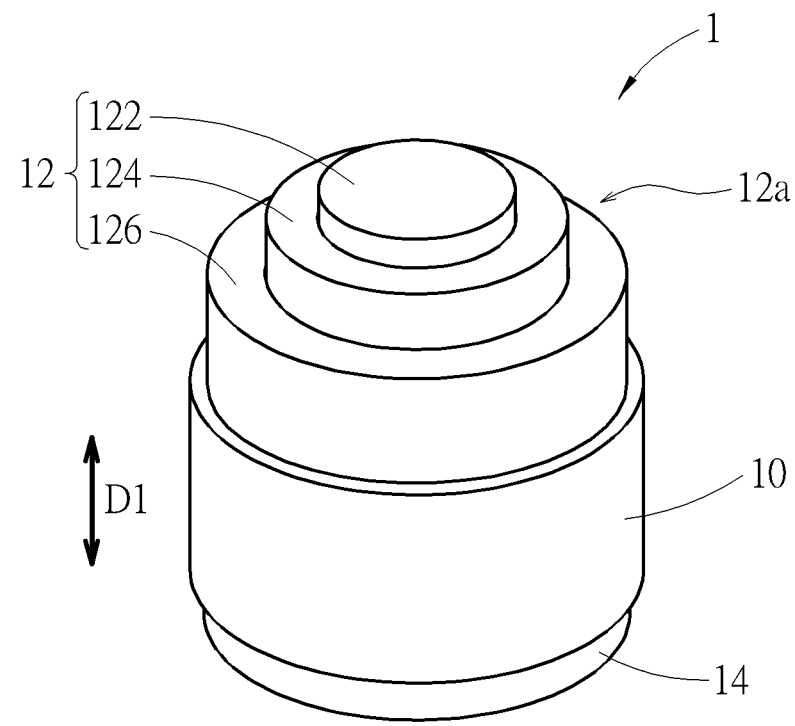
FIG. 2 is a schematic diagram illustrating the calibration kit in FIG. 1 after the calibration kit is operated to form a three-dimensional calibration surface configuration.
Figure 3:
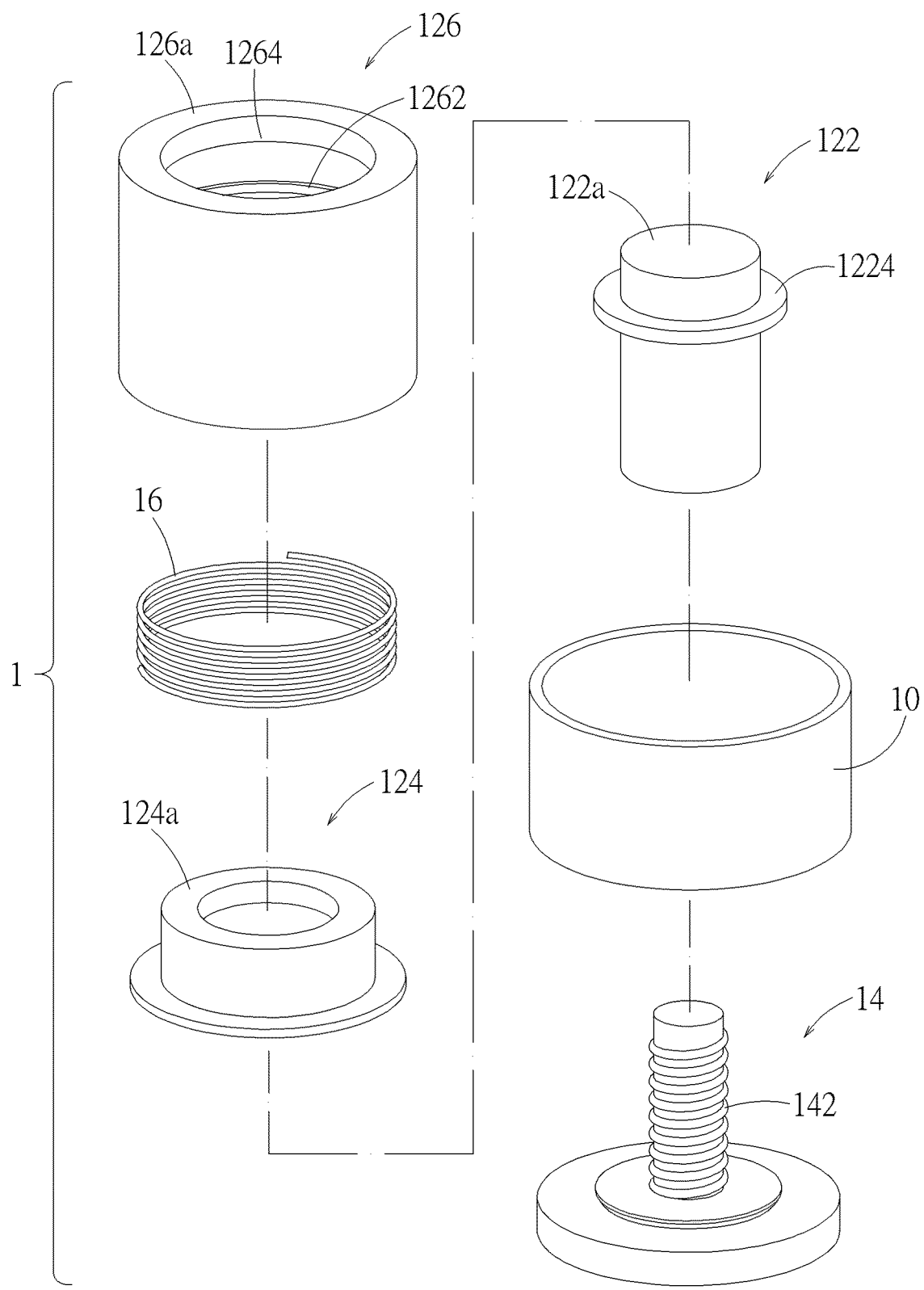
FIG. 3 is an exploded view of the calibration kit in FIG. 1.
Figure 4:
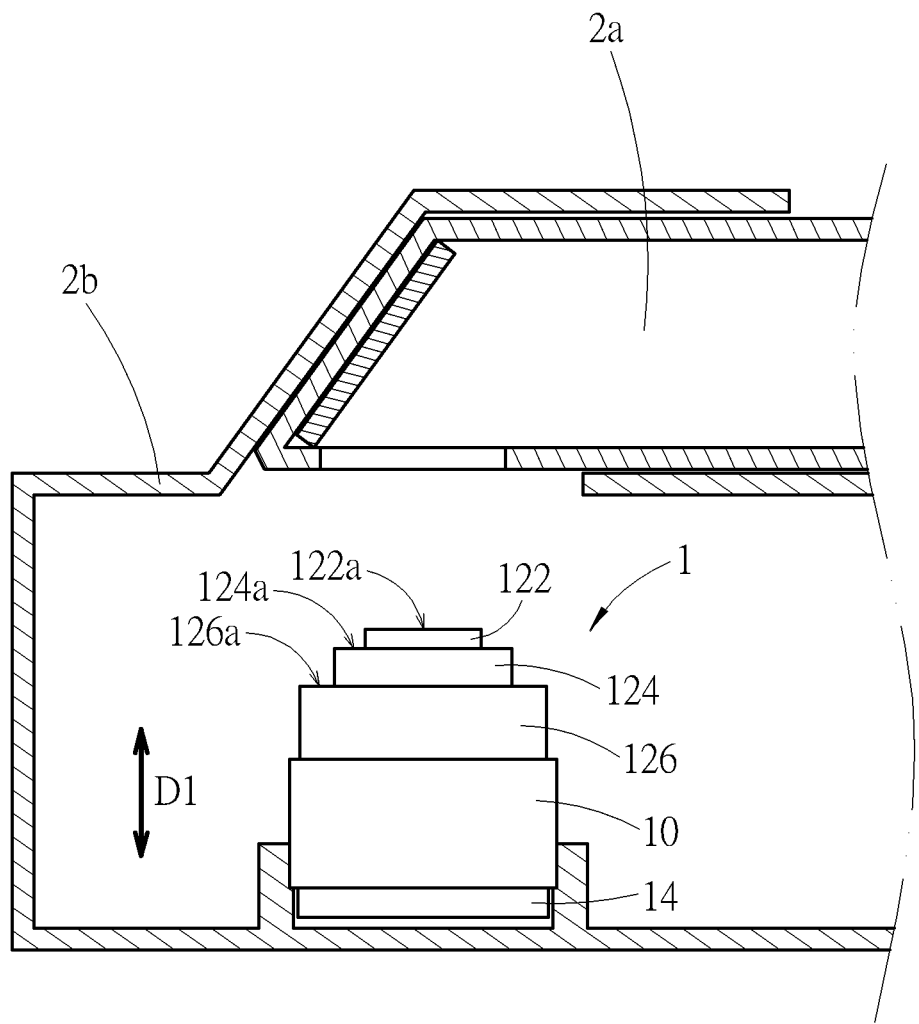
FIG. 4 is a schematic diagram illustrating an optical scanning device which is being calibrated by using the calibration kit in FIG. 2.

Please refer to FIGS. 1 to 3. A calibration kit 1 for an optical scanning device according to an embodiment includes a base 10, a combination of calibration parts 12, and a manipulation part 14. The combination of calibration parts 12 is disposed on the base 10. The manipulation part 14 is movably or rotatably disposed on the base 10. The manipulation part 14 is configured to be operable to drive the combination of calibration parts 12 to form a three-dimensional calibration surface configuration 12a (as shown by FIG. 2), for calibrating an optical scanning device (e.g. but not limited to an oral scanner) through the three-dimensional calibration surface configuration 12a (as shown by FIG. 4). Therein, the calibration kit 1 is disposed in a mount 2b. A probe 2a of an oral scanner extends into the mount 2b and faces the three-dimensional calibration surface configuration 12a. In practice, the base 10 can be structurally integrated with the mount 2b. For example, the base 10 and the mount 2b are formed in a single part.

Figure 5:
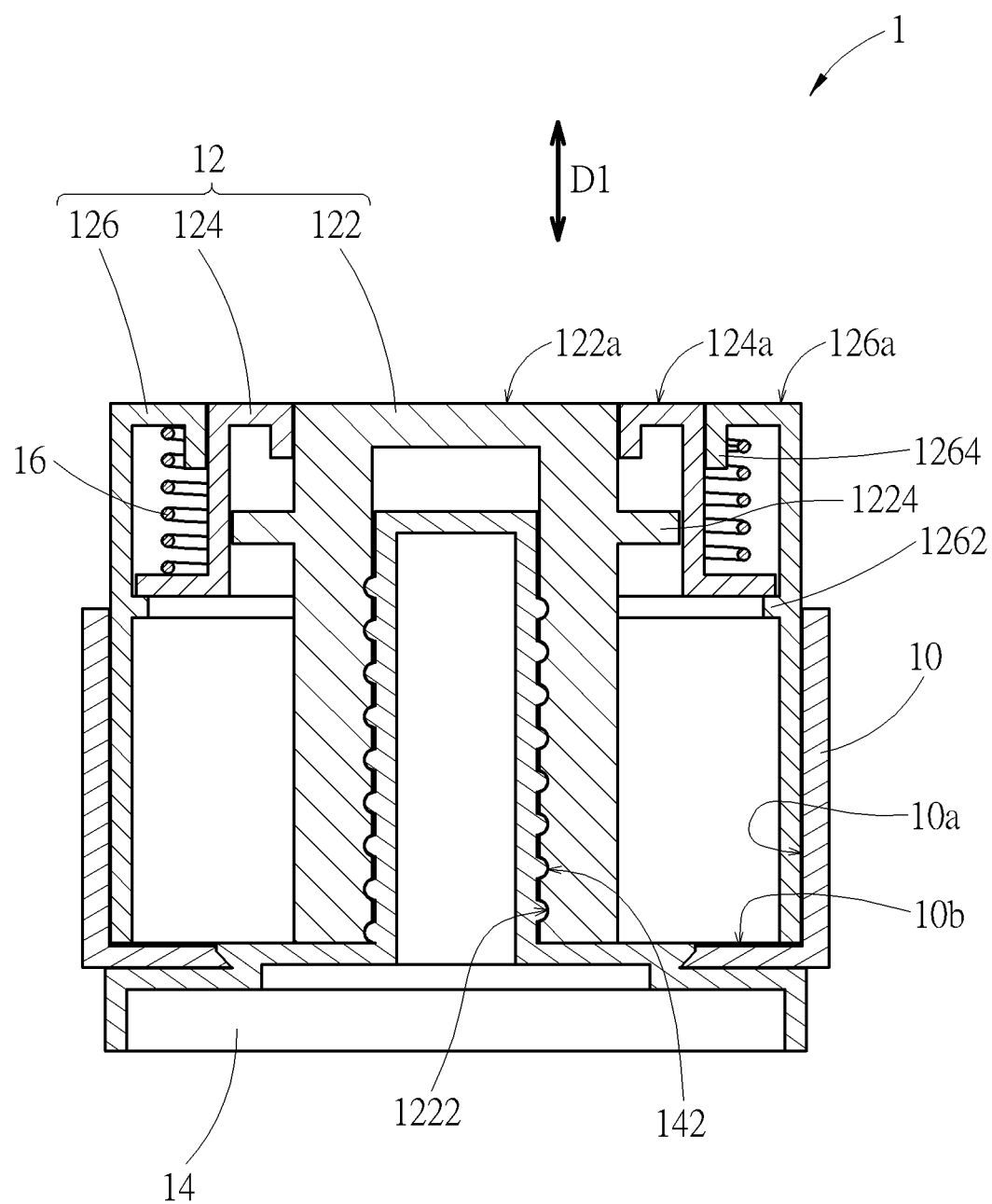
FIG. 5 is a sectional view of the calibration kit in FIG. 1 along the line X-X.
Figure 6:
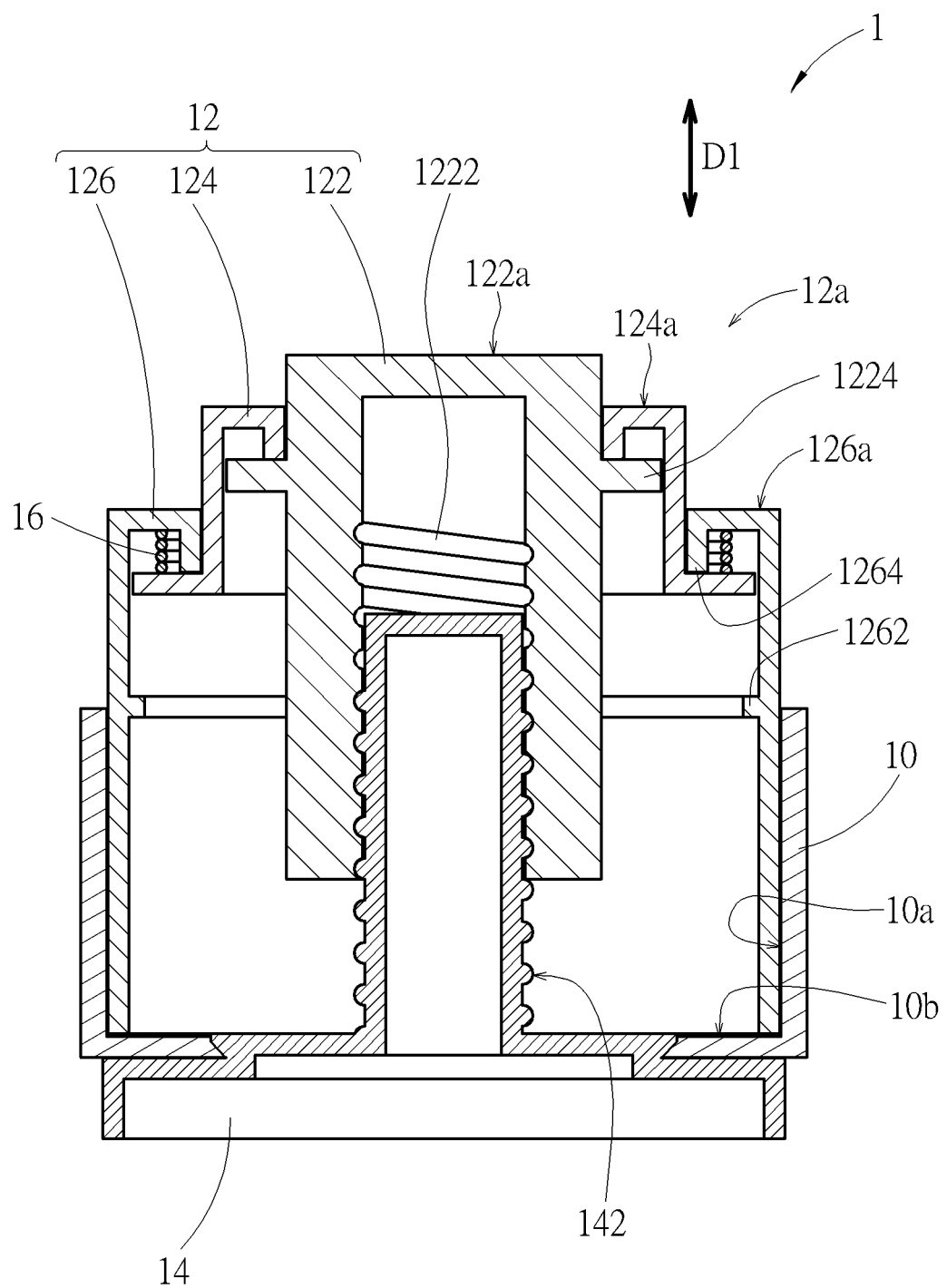
FIG. 6 is a sectional view of the calibration kit in FIG. 2; therein, the position of the cutting plane is the same as that in FIG. 5.

Please refer to FIGS. 1 to 3, FIG. 5 and FIG. 6. In the embodiment, the combination of calibration parts 12 includes a first calibration part 122, a second calibration part 124, and a third calibration part 126. The first calibration part 122 has a first calibration surface 122a. The second calibration part 124 has a second calibration surface 124a. The third calibration part 126 has a third calibration surface 126a. The manipulation part 14 is rotatably disposed on the base 10. The first calibration part 122 is engaged with the manipulation part 14. The second calibration part 124 is sleeved on the outside of the first calibration part 122. The third calibration part 126 is fixedly disposed on the base 10 and is sleeved on the outside of the second calibration part 124. The first calibration part 122 and the second calibration part 124 are movable relative to each other in a movement direction D1 (indicated by a double-headed arrow in the figures) and are movable relative to the base 10. The manipulation part 14 is operable to drive the first calibration part 122 and the second calibration part 124 to move relative to the base 10 in the movement direction D1, so that the combination of calibration parts 12 forms the three-dimensional calibration surface configuration 12a through the first calibration surface 122a, the second calibration surface 124a, and the third calibration surface 126a (as shown by FIG. 2 and FIG. 6). Similarly, the manipulation part 14 also can be operable to drive the first calibration part 122 and the second calibration part 124 to move relative to the base 10 in the movement direction D1, so that the first calibration surface 122a, the second calibration surface 124a, and the third calibration surface 126a are coplanar (as shown by FIG. 1 and FIG. 5) for easy storage. Furthermore, in practice, the calibration kit 1 in FIG. 1 and FIG. 5 are not limited to the calibration surfaces 122a, 124a and 126a forming a flat surface. In principle, as long as the first calibration part 122 and second calibration part 124 are retracted toward the inner side of the base 10, there is an effect of shortening the overall height of the calibration kit 1, which is also conducive to storage.

In the embodiment, the manipulation part 14 and the first calibration part 122 are engaged through a thread structure. The thread structure includes an external thread 142 and an internal thread 1222 engaged with the external thread 142. The external thread 142 and the internal thread 1222 are formed on the manipulation part and the first calibration part 122 respectively. When the manipulation part 14 rotates relative to the base 10, the manipulation part 14 drives the first calibration part 122 through the thread structure to move parallel to the movement direction D1. The first calibration part 122 has an abutting portion 1224. The first calibration part 122 moves the second calibration part 124 through the abutting portion 1224, so that the manipulation part 14 is operable to move the first calibration part 122 and move the second calibration part 124 through the first calibration part 122.

Furthermore, the calibration kit 1 includes a resilient part 16, configured to drive the second calibration part 124 to abut against the first calibration part 122. For example, the resilient part 16 (e.g. but not limited to a spring) compressively abuts against and between the second calibration part 124 and the third calibration part 126, so that in the view point of FIG. 5 or FIG. 6, the resilient part 16 pushes the second calibration part 124 downward. When the abutting portion 1224 of the first calibration part 122 touches the second calibration part 124, the second calibration part 124 also keeps abutting against the abutting portion 1224. In other words, at this time, the first calibration part 122 and the second calibration part 124 abuts against each other. In practice, the resilient part 16 may alternatively be disposed between the base 10 and the second calibration part 124. For example, a spring (as the resilient part 16) is stretched and connected to and between the base 10 and the second calibration part 124, which also can keep the second calibration part 124 in abutting against the abutting portion 1224 when the abutting portion 1224 of the first calibration part 122 touches the second calibration part 124.

Furthermore, the third calibration part 126 has a limitation portion 1262. During the process of manipulating the manipulation part 14 to transform the calibration kit 1 from the state as shown by FIG. 6 to the state as shown by FIG. 5, when the manipulation part 14 is rotated relative to the base 10 to move the first calibration part 122 downward (parallel to the movement direction D1), the second calibration part 124 also moves downward under the effect of the resilient part 16 until it is blocked by the limitation portion 1262 (as shown by FIG. 5). In practice, the limitation portion 1262 may alternatively be disposed on the base 10. For example, the third calibration part 126 is fixedly sleeved on the outside of the base 10. The base 10 forms a limitation portion which protrudes inward from an inner wall surface 10a of the base 10. For another example, the base 10 forms a limitation portion which protrudes upward from an inner bottom surface 10b of the base 10. In these two examples, both limitation portions can perform the function of the above limitation portion 1262. For another example, the second calibration part 124 can extend downward in structure, so that the inner bottom surface 10b of the base 10 can directly block the second calibration part 124 that moves downward. In this case, the bottom surface 10b also can perform the function of the above limitation portion 1262.

In addition, in the embodiment, the third calibration part 126 has another limitation portion 1264. During the process of manipulating the manipulation part 14 to transform the calibration kit 1 from the state as shown by FIG. 5 to the state as shown by FIG. 6, the second calibration part 124 is pushed by the first calibration part 122 to move upward (parallel to the movement direction D1) until it is blocked by the limitation portion 1264 (as shown by FIG. 6). At this moment, the first calibration part 122 and the second calibration part 124 stop moving upward. The manipulation part 14 can no longer be rotated relative to the first calibration part 122 (and base 10). Thereby, the user can easily rotate the manipulation part 14 until the manipulation part 14 can no longer be rotated; then the calibration parts are positioned to form the expected three-dimensional calibration surface configuration 12a. In practice, the positioning of the calibration parts can also be achieved through other methods. For example, the base 10 and the manipulation part 14 are provided with corresponding marks thereon, so that the user can achieve the effect of positioning each calibration part by aligning the marks.

Figure 7:
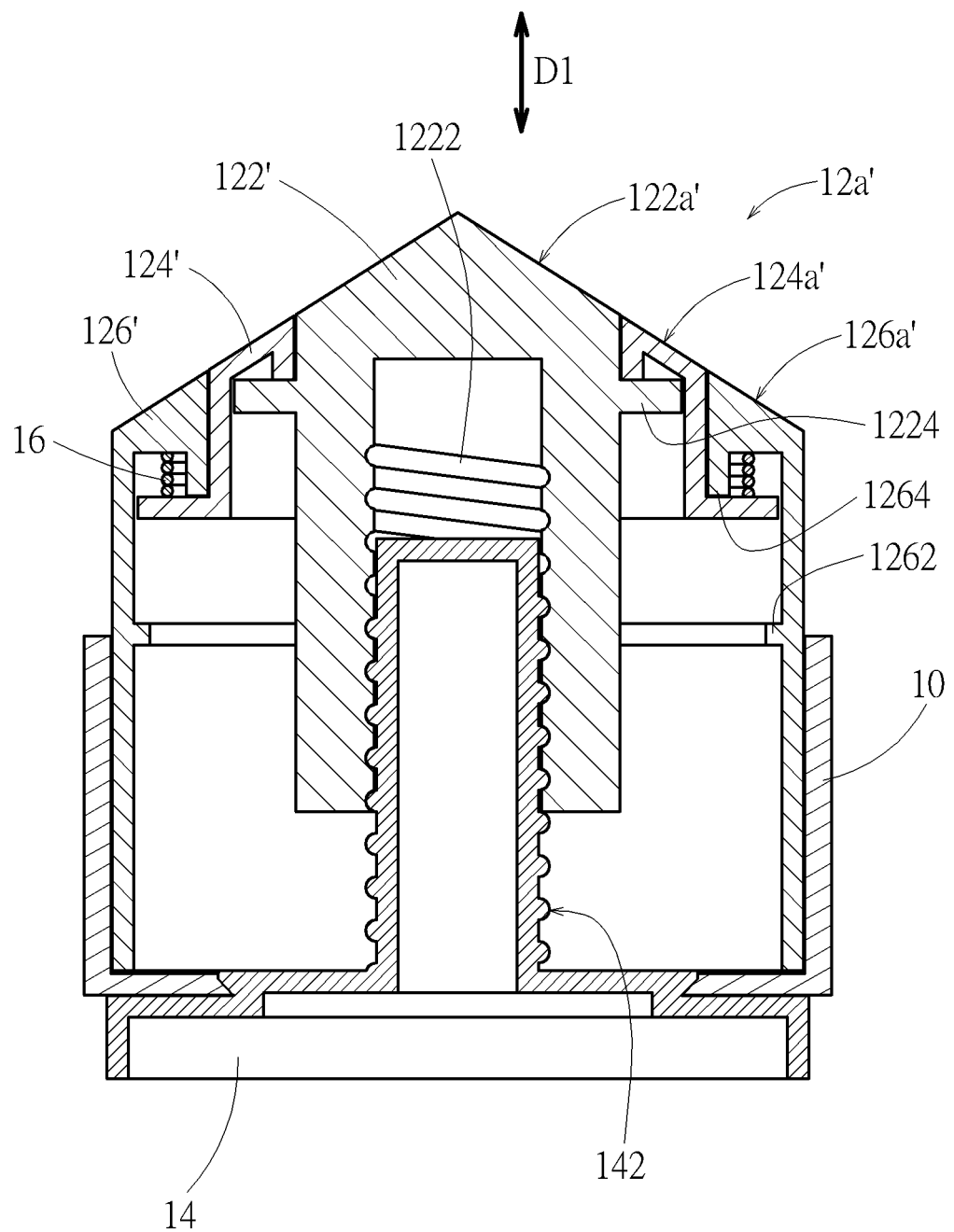
FIG. 7 is a sectional view of a modification of the calibration kit in FIG. 6.
Figure 8:
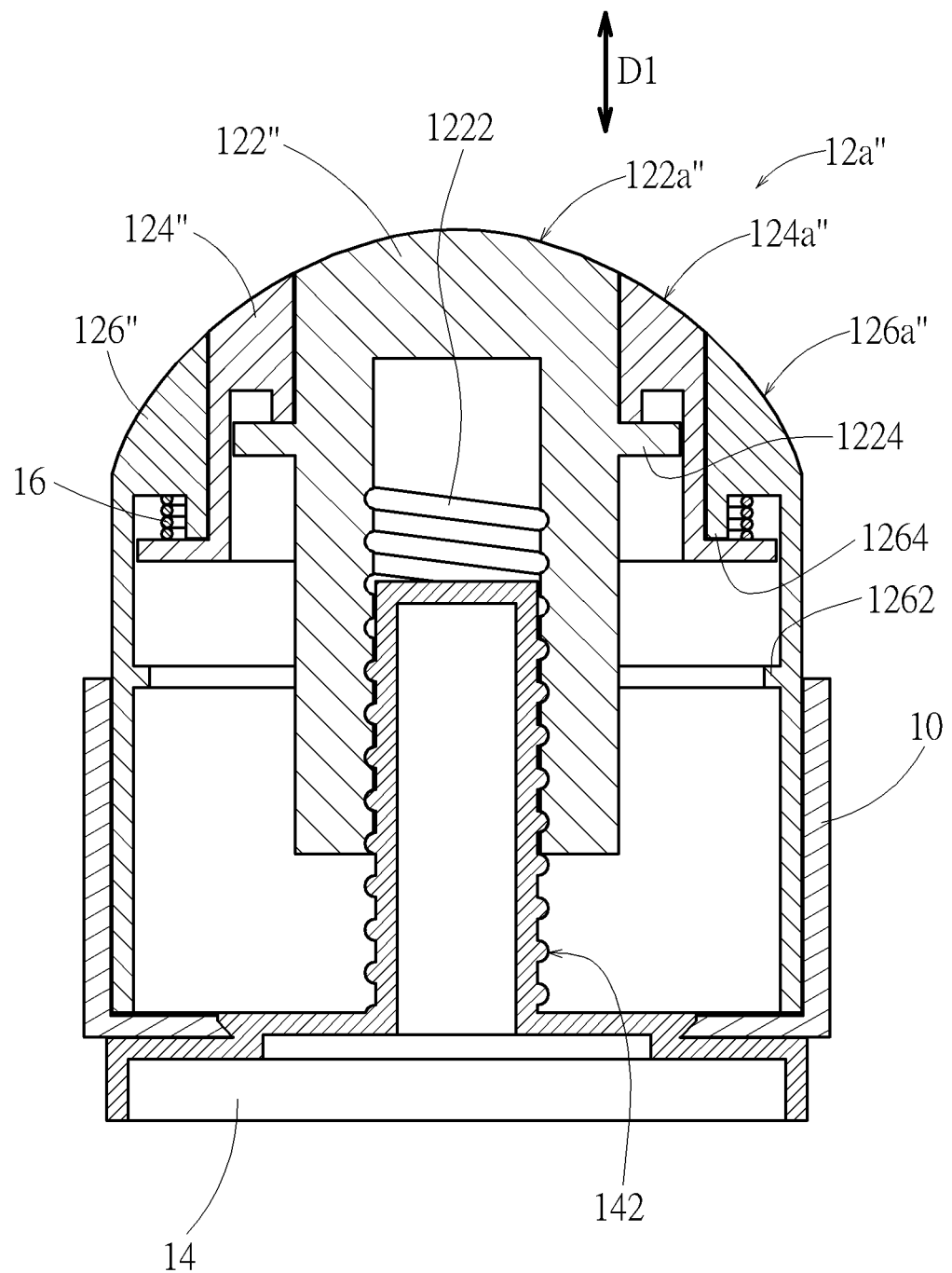
FIG. 8 is a sectional view of another modification of the calibration kit in FIG. 6.
Figure 9:
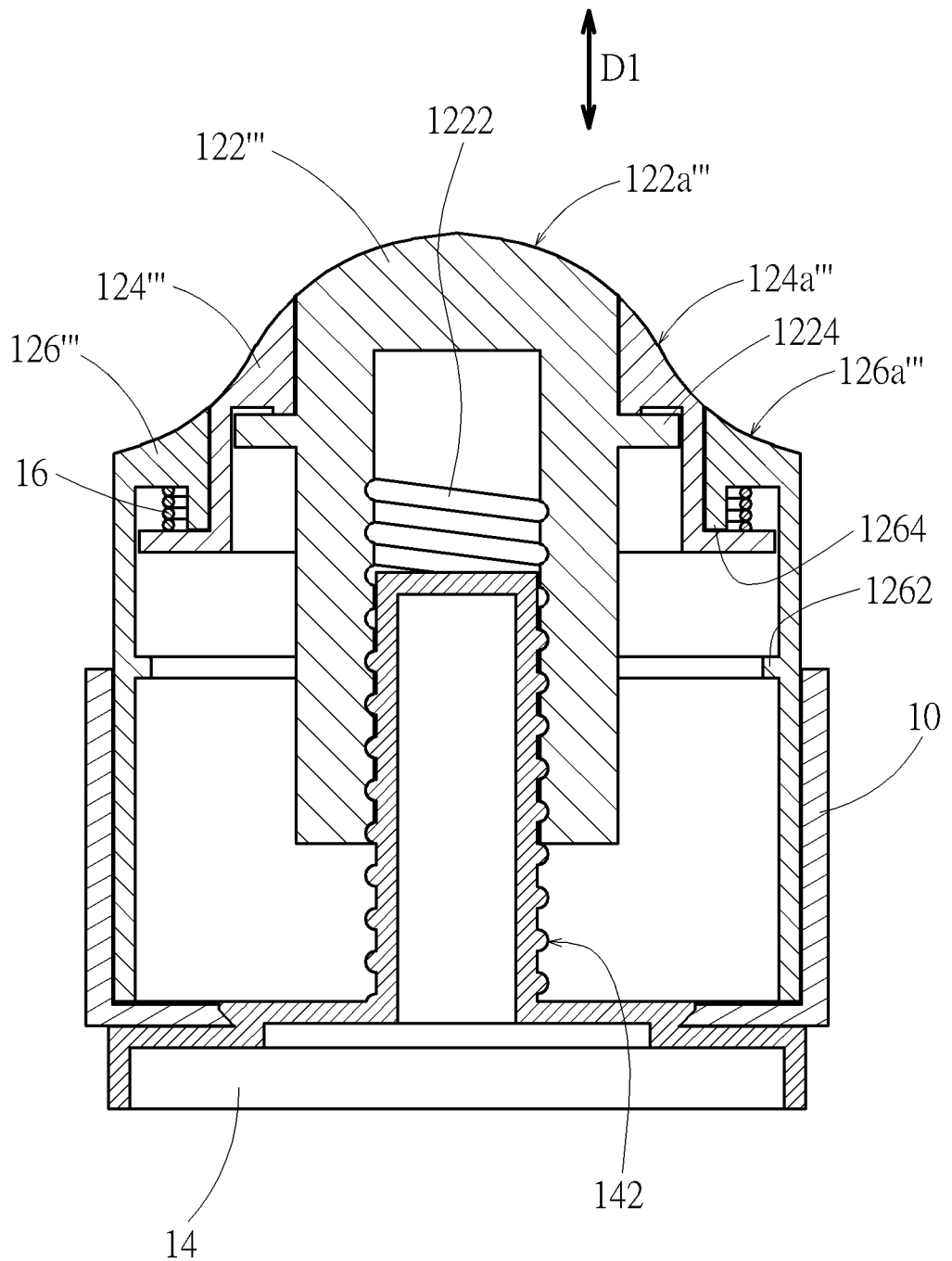
FIG. 9 is a sectional view of another modification of the calibration kit in FIG. 6.

Furthermore, in the embodiment, the three-dimensional calibration surface configuration 12a shows a protruding structure. The first calibration surface 122a, the second calibration surface 124a, and the third calibration surface 126a are all flat surfaces; however, it is not limited thereto. For example, as shown by FIG. 7, each of the first calibration surface 122a' (of the first calibration part 122'), the second calibration surface 124a' (of the second calibration part 124"), and the third calibration surface 126a' (of the third calibration part 126') includes an oblique surface, so that the three-dimensional calibration surface configuration 12a' as a whole shows a tapered surface. For another example, as shown by FIG. 8, each of the first calibration surface 122a" (of the first calibration part 122"), the second calibration surface 124a" (of the second calibration part 124"), and the third calibration surface 126a" (of the third calibration part 126") includes a curved surface, so that the three-dimensional calibration surface configuration 12a' as a whole shows a continuous convex surface. For another example, as shown by FIG. 9, each of the first calibration surface 122a''' (of the first calibration part 122'''), the second calibration surface 124a''' (of the second calibration part 124"), and the third calibration surface 126a''' (of the third calibration part 126''') includes a combination of oblique and curved surfaces. For another example, the first calibration surface 122a, the second calibration surface 124a, and the third calibration surface 126a as a whole can be designed to show a combination of other geometric surfaces. In addition, in the embodiment, the overall appearance of the combination of calibration parts 12 is roughly cylindrical; however, it is not limited thereto. For example, in accordance with the geometric structure of the three-dimensional calibration surface configuration 12a, the overall appearance of the combination of calibration parts 12 can also be a square column or a columnar structure with other geometric cross-sections.

In the embodiment, for simplification of drawings and descriptions, each component is shown in a single structure in the figures. In practice, each component can be achieved by a structural combination according to actual product designs, which will not be described in addition. Furthermore, in the embodiment, the third calibration part 126 is fixedly disposed on the base 10, so in structural logic, the third calibration part 126 and the base 10 can be taken as the same component. For example, the third calibration part 126 and the base 10 can be structurally integrated into a single part, e.g. integrally formed. In this case, the single part functions as the base 10 and the third calibration part 126. In addition, in the embodiment, the combination of calibration parts 12 is illustrated by three calibration parts. However, the combination of calibration parts can be achieved by less or more calibration parts, which will not be described. In addition, in the embodiment, the combination of calibration parts 12 when the second calibration part 124 abuts the limitation portion 1264 is defined as the three-dimensional calibration surface configuration 12a. In practice, it is practicable that the combination of calibration parts 12 when the first calibration part 122 move the second calibration part 124 upward to another position relative to the third calibration part 126 (in which the second calibration part 124 does not abut against the limitation portion 1264) is defined as another three-dimensional calibration surface configuration. Therein, The positioning of said another position can be achieved by arranging corresponding marks on the base 10 and the manual part 14 for the user to align the marks. In other words, in practice, the combination of calibration parts 12 can be selectively formed into different three-dimensional calibration surface configurations by manipulating the manipulation part 14, which helps increase the flexibility of the calibration of the optical scanning device.

Figure 10:
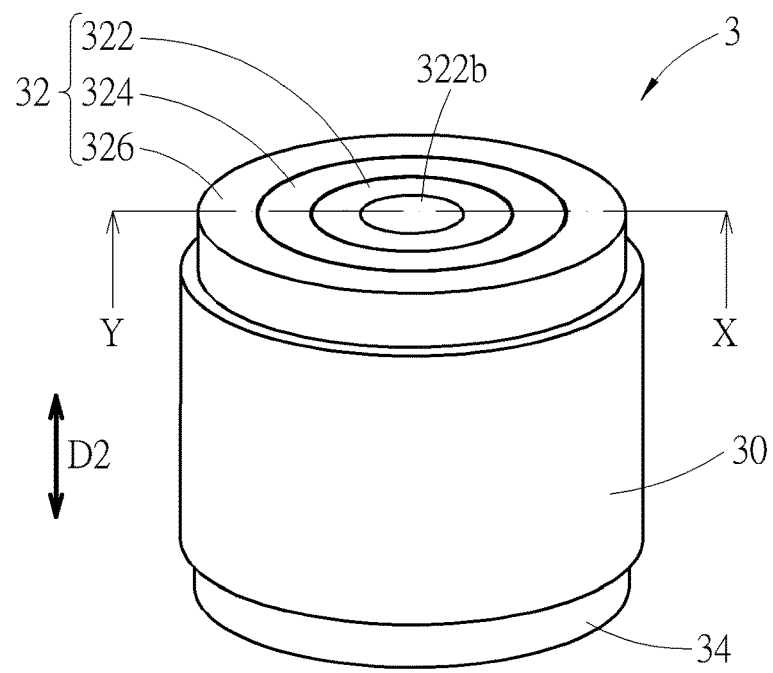
FIG. 10 is a schematic diagram illustrating a calibration kit for an optical scanning device according to another embodiment.
Figure 11:
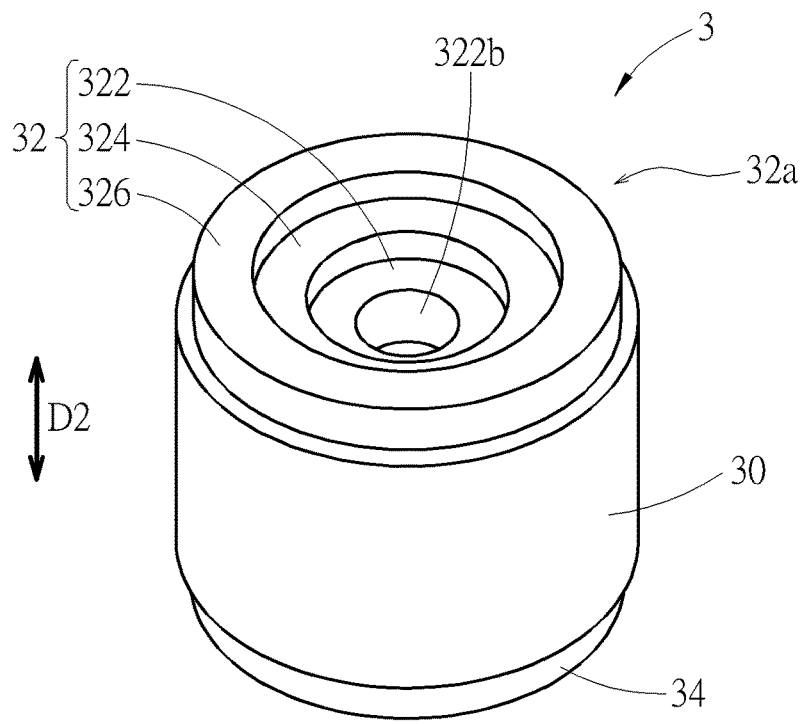
FIG. 11 is a schematic diagram illustrating the calibration kit in FIG. 10 after the calibration kit is operated to form a three-dimensional calibration surface configuration.
Figure 12:
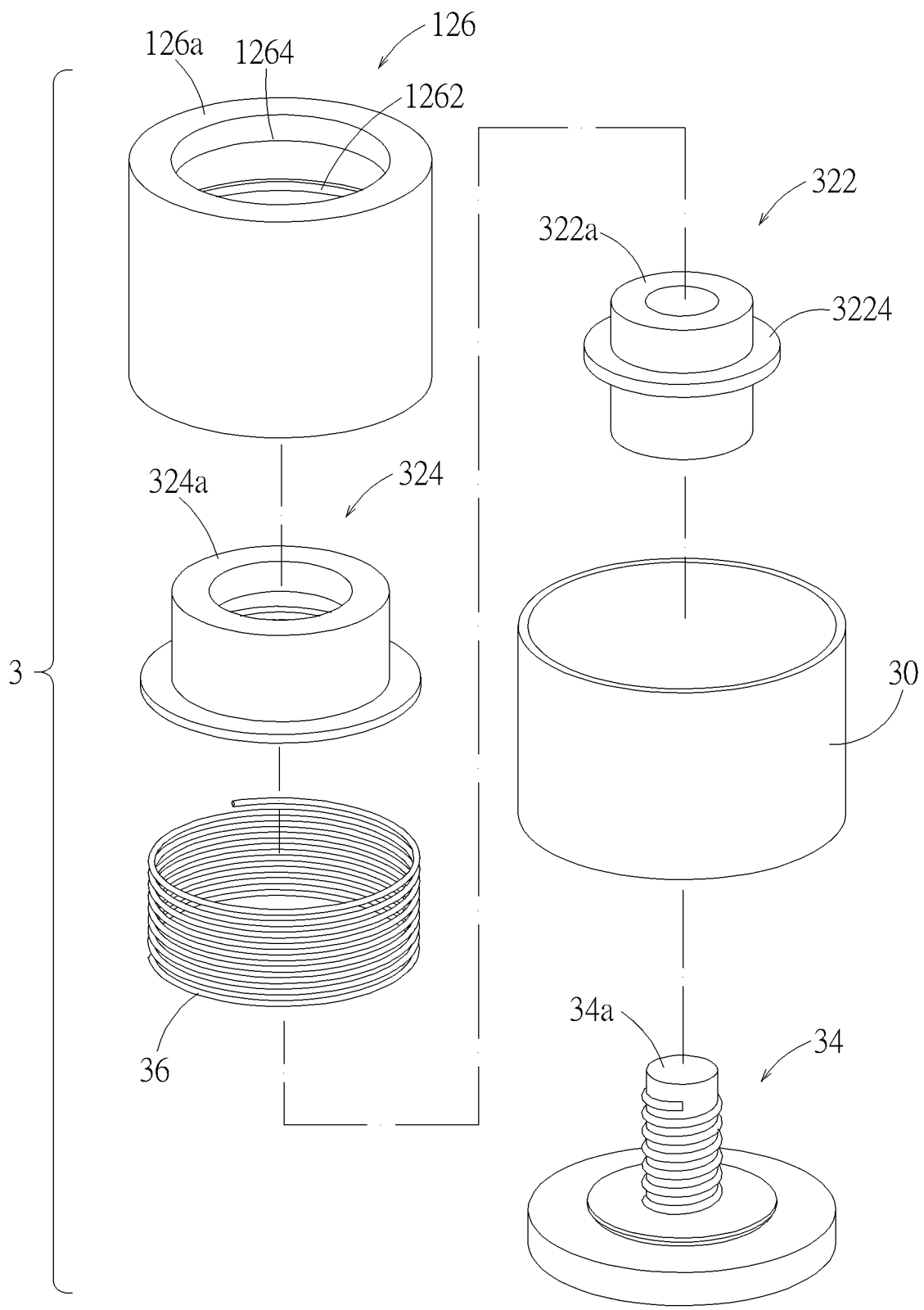
FIG. 12 is an exploded view of the calibration kit in FIG. 10.

Please refer to FIG. 10 and FIG. 11. A calibration kit 3 according to another embodiment includes a base 30, a combination of calibration parts 32, and a manipulation part 34. The combination of calibration parts 32 is disposed on the base 30. The manipulation part 34 is movably or rotatably disposed on the base 30. The manipulation part 34 is configured to be operable to drive the combination of calibration parts 32 to form a three-dimensional calibration surface configuration 32a (as shown by FIG. 11), for calibration of an optical scanning device (such as but not limited to an oral scanner). The calibration kit 3 is similar to the calibration kit 1 in structure and operation. For other descriptions about the components of the calibration kit 3, please refer to the relevant descriptions of the same-named components in the calibration kit 1. Furthermore, if the previous description about the calibration kit 1 and variants thereof is applicable, it is also applicable to the calibration kit 3, and will not be repeated in addition.

Figure 13:
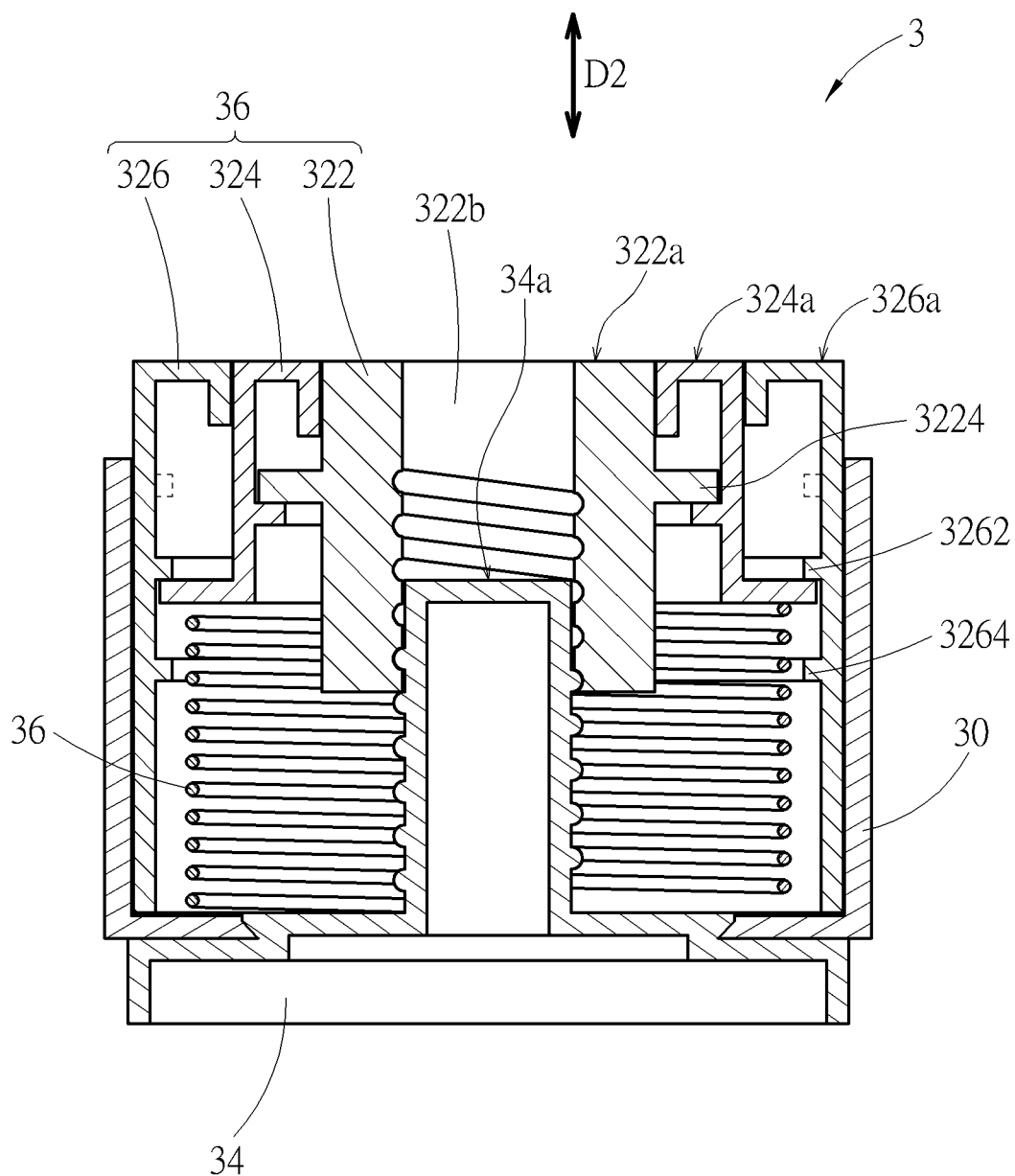
FIG. 13 is a sectional view of the calibration kit in FIG. 10 along the line Y-Y.
Figure 14:
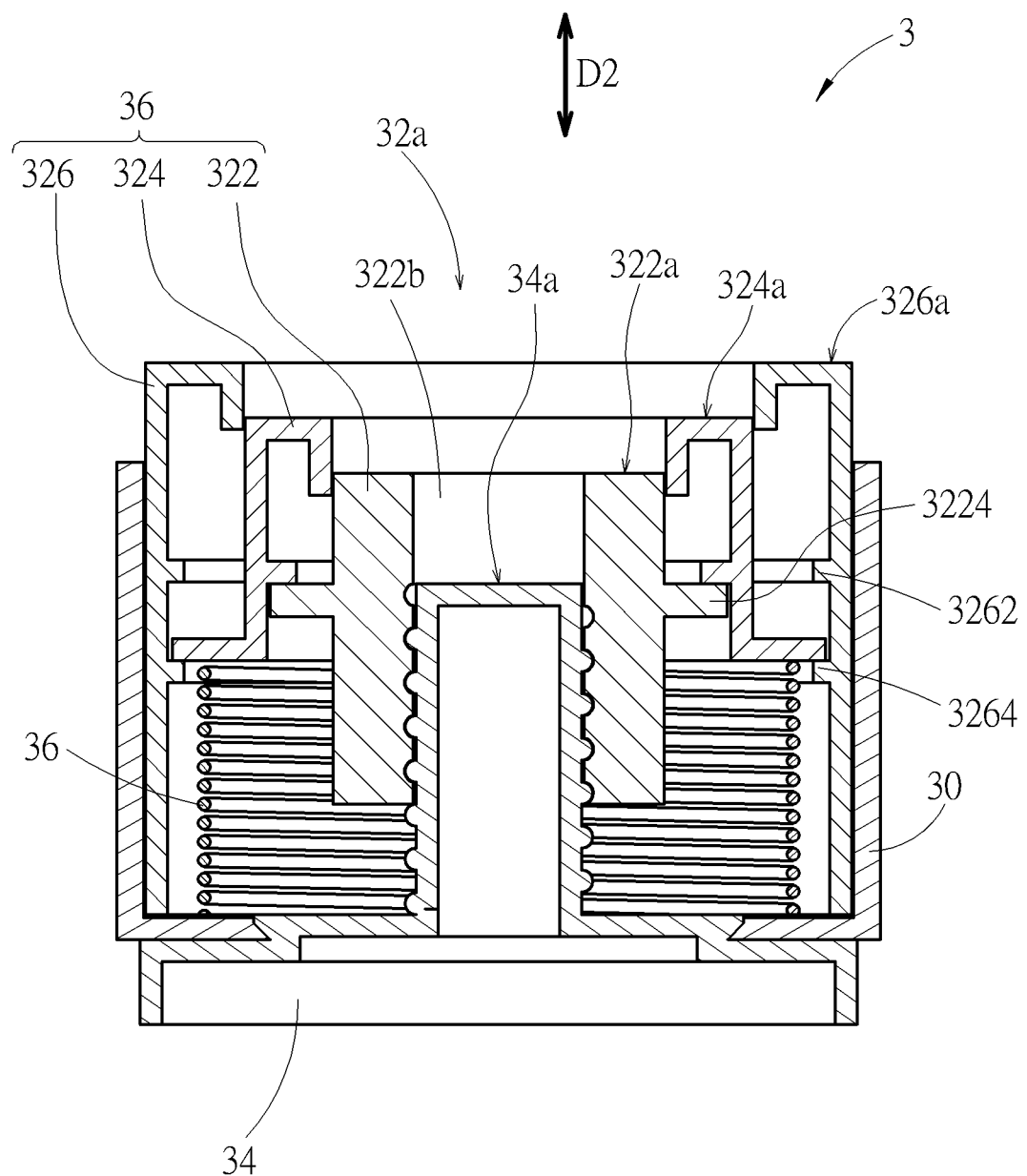
FIG. 14 is a sectional view of the calibration kit in FIG. 11; therein, the position of the cutting plane is the same as that in FIG. 13.

Please refer to FIG. 10 to FIG. 14. In the embodiment, the combination of calibration parts 32 includes a first calibration part 322, a second calibration part 324, and a third calibration part 326. The first calibration part 322 has a first calibration surface 322a. The second calibration part 324 has a second calibration surface 324a. The third calibration part 326 has a third calibration surface 326a. The manipulation part 34 is rotatably disposed on the base 30 and has a fourth calibration surface 34a. The first calibration part 322 is engaged with the manipulation part 34. The first calibration part 322 has a through hole 322b. The fourth calibration surface 34a is exposed from the through hole 322b. The second calibration part 324 is sleeved on the outside of the first calibration part 322. The third calibration part 326 is fixedly disposed on the base 30 and is sleeved on the outside of the second calibration part 324. The first calibration part 322 and the second calibration part 324 are relatively movable and are movable relative to the base 30 in the movement direction D2 (indicated by a double-headed arrow in the figures). The manipulation part 34 is operable to drive the first calibration part 322 and the second calibration part 324 to move relative to the base 30 in the movement direction D2, so that the combination of calibration parts 32 form the three-dimensional calibration surface configuration 32a (as shown by FIG. 11 and FIG. 14) through the first calibration surface 322a, the second calibration surface 324a, and the third calibration surface 326a. Similarly, the manipulation part 34 also can be operable to drive the first calibration part 322 and the second calibration part 324 to move relative to the base 30 in the movement direction D2, so that the first calibration surface 322a, the second calibration surface 324a, and the third calibration surface 326a are coplanar (as shown by FIG. 10 and FIG. 13).

In the embodiment, the manipulation part 34 and the first calibration part 322 are engaged through a thread structure. When the manipulation part 34 rotates relative to the base 30, the manipulation part 34 drives the first calibration part 322 to move parallel to the movement direction D2 through the thread structure. The first calibration part 322 has an abutting portion 3224 and moves the second calibration part 324 through the abutting portion 3224, so that the manipulation part 34 can be operable to move the first calibration part 322 and move the second calibration part 324 through the first calibration part 322.

Furthermore, the calibration kit 3 includes a resilient part 36, configured to drive the second calibration part 324 to abut against the first calibration part 322. For example, by the resilient part 36 (e.g. but not limited to a spring) compressively abuts against and between the second calibration part 324 and the base 30, so that in the view point of FIG. 13 or FIG. 14, the resilient part 36 pushes the second calibration part 324 downward. When the abutting portion 3224 of the first calibration part 322 touches the second calibration part 324, the second calibration part 324 keeps abutting against the abutting portion 3224. In practice, the resilient part 36 may alternatively be disposed between the second calibration part 324 and the third calibration part 326. For example, a spring (as the resilient part 36) is stretched and connected to and between the second calibration part 324 and the third calibration part 326, which also can keep the second calibration part 324 in abutting against the abutting portion 3224 when the abutting portion 3224 of the first calibration part 322 touches the second calibration part 324.

Furthermore, the third calibration part 326 has a limitation portion 3262. During the process of manipulating the manipulation part 34 to transform the calibration kit 3 from the state as shown by FIG. 14 to the state as shown by FIG. 13, when the manipulation part 34 is rotated relative to the base 30 to move the first calibration part 322 upward (parallel to the movement direction D2), the second calibration part 324 also moves upward under the effect of the resilient part 36 until it is blocked by the limitation portion 3262 (as shown by FIG. 13).

In addition, in the embodiment, the third calibration part 326 has another limitation portion 3264. During the process of manipulating the manipulation part 34 to transform the calibration kit 3 from the state as shown by FIG. 13 to the state as shown by FIG. 14, the second calibration part 324 is pushed by the first calibration part 322 to move downward (parallel to the movement direction D2) until it is blocked by the limitation portion 3264 (as shown by FIG. 14). At this moment, the first calibration part 322 and the second calibration part 324 stop moving downward. The manipulation part 34 can no longer be rotated relative to the first calibration part 322 (and base 30). Thereby, the user can easily rotate the manipulation part 34 until the manipulation part 34 can no longer be rotated; then the calibration parts are positioned to form the expected three-dimensional calibration surface configuration 32*a*. In practice, the positioning of the calibration parts can also be achieved through other methods. For example, the first calibration part 322 can extend downward in structure, so that when the calibration kit 3 is in the state shown in FIG. 14, the bottom of the first calibration part 322 abuts against the manipulation part 34 and can no longer move downward relative to the manipulation part 34. At the moment, the first calibration part 322 and the second calibration part 324 stop moving downward. It achieves the positioning effect.

Figure 15:
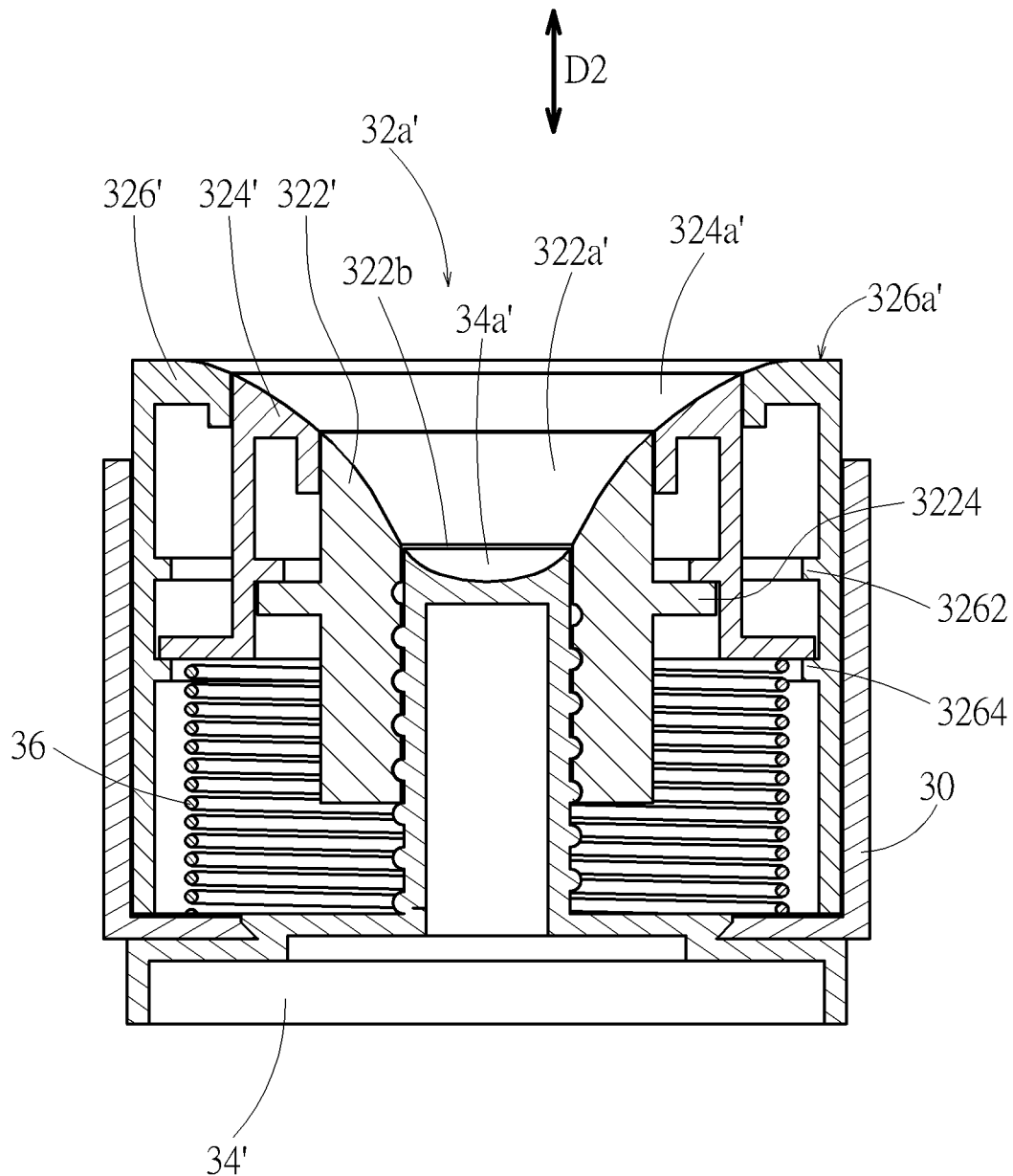
FIG. 15 is a sectional view of a modification of the calibration kit in FIG. 14.

Furthermore, in the embodiment, the three-dimensional calibration surface configuration 32*a* shows a recessed structure. The first calibration surface 322*a*, the second calibration surface 324*a*, the third calibration surface 326*a*, and the fourth calibration surface 34*a* are all flat surfaces; however, it is not limited thereto. For example, as shown by FIG. 15, each of the first calibration surface 322*a*' (of the first calibration part 322'), the second calibration surface 324*a*' (of the second calibration part 324'), and the third calibration surface 326*a*' (of the third calibration part 326') includes an curved surface, so that the three-dimensional calibration surface configuration 32*a*' as a whole shows a continuous concave surface. If the previous description about the calibration surfaces 122*a*, 124*a* and 126*a* and variants thereof is applicable, it is also applicable herein and will not be repeated in addition. Briefly, in practice, the first calibration surface 322*a*, the second calibration surface 324*a*, the third calibration surface 326*a*, and the fourth calibration surface 34*a* as a whole can be designed as a combination of other geometric surfaces as required.

In addition, in the embodiment, the combination of calibration parts 32 is illustrated by three calibration parts. However, the combination of calibration parts can be achieved by less or more calibration parts, which will not be described. Furthermore, in the embodiment, the three-dimensional calibration surface configuration 32*a* is achieved by four calibration surfaces; however, it is not limited thereto. For example, the first calibration part 322 no longer has the through hole 322*b*. The middle portion of the three-dimensional calibration surface configuration 32*a* is achieved only by the first calibration surface 322*a*, similar to the first calibration part 122 of the calibration kit 1. Similar to the calibration kit 1, in practice, the calibration kit 3 can define different three-dimensional calibration surface configurations by various configurations of the combination of calibration parts 32 that moves relative to the base 30, which helps increase the flexibility of the calibration of the optical scanning device.

In addition, as described above, the calibration kits 1 and 3 can provide the three-dimensional calibration surface configuration 12*a* in the form of a protruding structure and the three-dimensional calibration surface configuration 32*a* in the form of a recessed structure respectively. However, it is practicable to design a proper structure so that the same calibration kit can provide a three-dimensional calibration surface configuration with a protruding structure and a recessed structure. For example, the highest position of the second calibration part 324 moving upward can be changed by increasing the position of the limitation portion 3262 in the calibration kit 3 (shown in the dashed line in FIG. 13), so that the second calibration part 324 can move upward under the effect of the resilient part 36 and protrudes out of the third calibration part 326. At this moment, the manipulation part 34 is operable to drive the first calibration part 322 to move upward to protrude out of the second calibration part 324, thereby making the combination of calibration parts 32 in the form of a protruding structure. Thereby, the amended calibration kit 3 can provide a three-dimensional calibration surface configuration with a protruding structure and a recessed structure.

Figure 16:
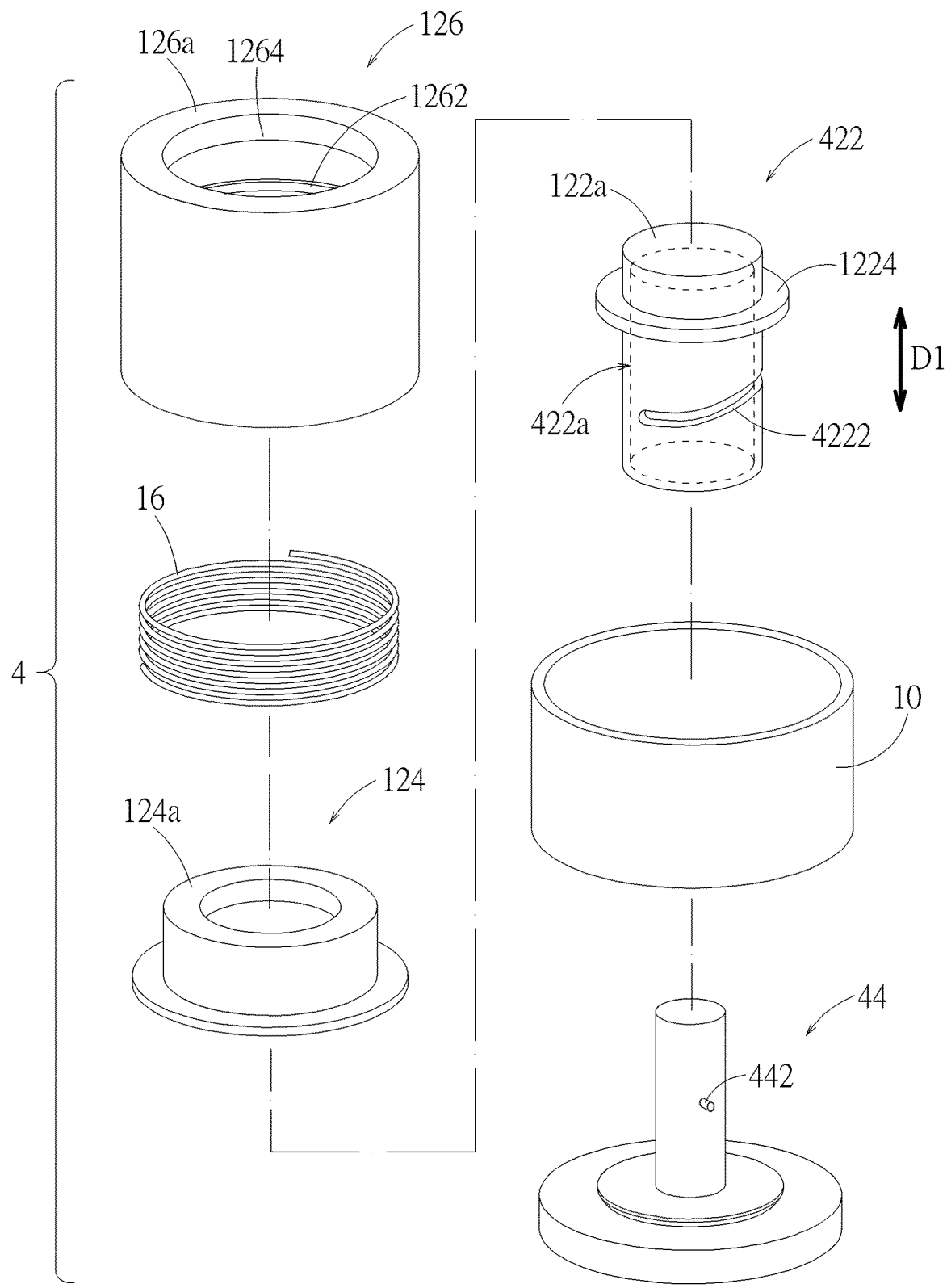
FIG. 16 is an exploded view of a calibration kit for an optical scanning device according to another embodiment.

In addition, as described above, in the calibration kits 1 and 3, the manipulation parts 14 and 34 and the first calibration parts 122 and 322 are engaged with each other through a thread structure respectively; however, they can also be linked by other structures in practice. For example, a calibration kit 4 shown by FIG. 16 is similar to the calibration kit 1 in structure and uses the reference number of the calibration kit 1 are used. For other descriptions about the components of the calibration kit 4, please refer to the relevant descriptions of the same-named components in the calibration kit 1. Furthermore, if the previous description about the calibration kit 1 and variants thereof is applicable, it is also applicable to the calibration kit 4, and will not be repeated in addition. In the calibration kit 4, a first calibration part 422 thereof has a spiral guiding groove 4222, and a manipulation part 44 thereof has a guiding post 442. The manipulation part 44 and the first calibration part 422 are engaged by inserting the manipulation part 44 into a hole 422*a* of a first calibration part 422 (of which the hidden profile is shown in dashed lines in the figure) to make the guiding post 442 slidably disposed in the spiral guiding groove 4222. Thereby, when the manipulation part 44 rotates relative to the first calibration part 422, the manipulation part 44 drives the first calibration part 422 to move up and down by the guiding post 442 sliding in the spiral guiding groove 4222. Similarly, in practice, the guiding post 442 may alternatively be disposed on an inner wall of the hole 422*a* of the first calibration part 422, and the spiral guiding groove 4222 is disposed on an outer side of the manipulation part 44 correspondingly. This configuration can also make the manipulation part 44 drive the first calibration part 422 to move up and down when the manual part 44 rotates relative to the first calibration part 422. Furthermore, in practice, the spiral guiding groove 4222 can be provided with a positioning structure at an appropriate position (one or more places) thereof, e.g. a protruding resilient holding structure (e.g. protruding from the side wall of the guiding groove toward the inside of the guiding groove; e.g. achieved by a metal resilient piece or a cantilever resilient structure that is formed by the side wall) or a recess (e.g. formed at the bottom wall of the guiding groove;

therein, the guiding post 442 can be achieved by a ball plunger correspondingly), for locating the guiding post 442 to position the first calibration part 422. In addition, the structure and variant of the spiral guiding groove 4222 and the guiding post 442 can also be applied to the calibration kit 3, which will not be further described.

Figure 17:
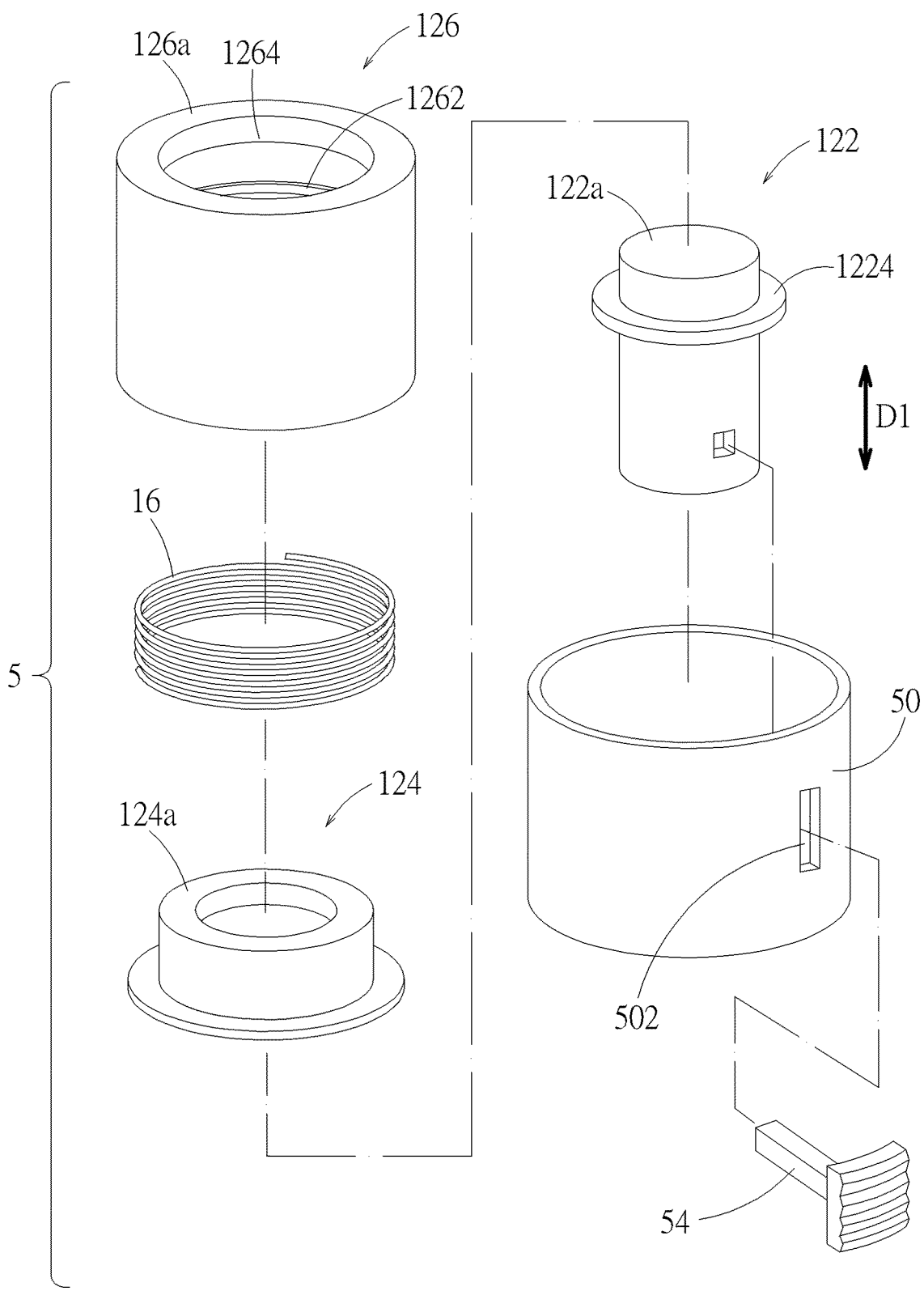
FIG. 17 is an exploded view of a calibration kit for an optical scanning device according to another embodiment.

In addition, as described above, in the calibration kits 1 and 3, the manipulation parts 14 and 34 are rotatably disposed on the base 10 and 30 and are rotatably move the first calibration parts 122 and 322; however, it is not limited thereto. For example, a calibration kit 5 shown by FIG. 17 is similar to the calibration kit 1 in structure and uses the reference number of the calibration kit 1 are used. For other descriptions about the components of the calibration kit 5, please refer to the relevant descriptions of the same-named components in the calibration kit 1. Furthermore, if the previous description about the calibration kit 1 and variants thereof is applicable, it is also applicable to the calibration kit 5, and will not be repeated in addition. In the calibration kit 5, a manipulation part 54 is movably disposed on a base 50 in the movement direction D1. The manipulation part 54 is operable to move in the movement direction D1 to move a first calibration part 522 of the calibration kit 5. Therein, the base 50 has a guiding groove 502. The manipulation part 54 is slidably disposed on the guiding groove 502 and therefore is movable along the guiding groove 502 relative to the base 50 in a structurally constrained manner. The manipulation part 54 is connected to the first calibration part 522 inside the base 50 (e.g. but not limited to in a fixed connection) and protrudes from the base 50 to facilitate the user's operation. Thereby, the user can move the manipulation part 54 to move the first calibration part 522 in the movement direction D1. In practice, the guiding groove 502 can also be spiral. Furthermore, it is the same as setting the positioning structure on the spiral guiding groove 4222 that the guiding groove 502 can be provided with a positioning structure at an appropriate position in practice for locating the manipulation part 54 to position the first calibration part 522, which will not be described in addition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration kit for an optical scanning device, the calibration kit comprising:
    a base;
    a combination of calibration parts, disposed on the base, the combination of calibration parts comprising a first calibration part and a second calibration part, the first calibration part and the second calibration part abutting against each other, the first calibration part having a first calibration surface, the second calibration surface having a second calibration surface, the first calibration surface and the second calibration surface being movable relative to each other in a movement direction and being movable relative to the base; and
    a manipulation part, movably or rotatably disposed on the base, the manipulation part being configured to be operable to drive the first calibration part and the second calibration part to move relative to the base, so that the combination of calibration parts forms a three-dimensional calibration surface configuration through the first calibration surface and the second calibration surface;
    wherein the manipulation part moves the first calibration part and moves the second calibration part through the first calibration part.

2. The calibration kit according to claim 1, further comprising a resilient part configured to drive the second calibration part to abut against the first calibration part.

3. The calibration kit according to claim 2, wherein the combination of calibration parts comprises a third calibration part, fixedly disposed on the base, the third calibration part has a third calibration surface, the resilient part is located between the second calibration part and the third calibration part, the resilient part abuts against the second calibration part and the third calibration part, and the combination of calibration parts forms the three-dimensional calibration surface configuration through the first calibration surface, the second calibration surface, and the third calibration surface.

4. The calibration kit according to claim 1, wherein the second calibration part is sleeved on the outside of the first calibration part.

5. The calibration kit according to claim 4, wherein the combination of calibration parts comprises a third calibration part, fixedly disposed on the base and sleeved on the outside of the second calibration part, the third calibration part has a third calibration surface, and the combination of calibration parts forms the three-dimensional calibration surface configuration through the first calibration surface, the second calibration surface, and the third calibration surface.

6. The calibration kit according to claim 5, further comprising a resilient part, the resilient part being located between the second calibration part and the third calibration part and abutting against the second calibration part and the third calibration part to drive the second calibration part to abut against the first calibration part.

7. The calibration kit according to claim 4, wherein the manipulation part has a fourth calibration surface, the first calibration part has a through hole, the fourth calibration surface is exposed from the through hole, the combination of calibration parts forms the three-dimensional calibration surface configuration through the first calibration surface, the second calibration surface, and the fourth calibration surface.

8. The calibration kit according to claim 1, wherein the manipulation part is rotatably disposed on the base and is engaged with the first calibration part.

9. The calibration kit according to claim 8, wherein the manipulation part and the first calibration part are engaged through a thread structure, and when the manipulation part rotates relative to the base, the manipulation part drives the first calibration part through the thread structure to move parallel to the movement direction.

10. The calibration kit according to claim 8, wherein the manipulation part and the first calibration part are engaged with each other through a spiral guiding groove and a guiding post, the guiding post is slidably disposed in the spiral guiding groove, one of the spiral guiding groove and the guiding post is disposed on the manipulation part, and the other one of the spiral guiding groove and the guiding post is disposed on the first calibration part.

11. The calibration kit according to claim 1, wherein the manipulation part is movably disposed on the base in the movement direction, and the manipulation part is operable to move in the movement direction to move the first calibration part.

12. The calibration kit according to claim 1, wherein the first calibration surface or the second calibration surface comprises a flat surface, an oblique surface, or a curved surface.

13. The calibration kit according to claim 1, wherein the three-dimensional calibration surface configuration as a whole is a recessed structure or a protruding structure.

14. The calibration kit according to claim 1, wherein the three-dimensional calibration surface configuration as a whole is a continuous convex surface or a continuous concave surface.

15. The calibration kit according to claim 1, wherein the manipulation part is operable to drive the first calibration part and the second calibration part to move relative to the base in the movement direction, so that the combination of calibration parts selectively forms another three-dimensional calibration surface configuration through the first calibration surface and the second calibration surface.

* * * * *